United States Patent [19]

Tanaka et al.

[11] Patent Number: 4,863,031
[45] Date of Patent: Sep. 5, 1989

[54] DISC CARTRIDGE HAVING PERIPHERAL DISC SUPPORT

[75] Inventors: Kimio Tanaka; Haruo Shiba, both of Nagano, Japan

[73] Assignee: TDK Corporation, Japan

[21] Appl. No.: 942,396

[22] Filed: Dec. 16, 1986

[30] Foreign Application Priority Data

Dec. 18, 1985 [JP] Japan .............................. 60-194551
Dec. 18, 1985 [JP] Japan .............................. 60-194558

[51] Int. Cl.⁴ .......................................... B65D 85/30
[52] U.S. Cl. ..................................... 206/444; 206/313; 360/133
[58] Field of Search ............... 206/312, 313, 444, 303, 206/310, 309; 360/131–133, 99, 97

[56] References Cited

U.S. PATENT DOCUMENTS

| | | | |
|---|---|---|---|
| 2,691,440 | 10/1954 | Spugios et al. | 206/312 |
| 3,109,539 | 11/1963 | Turoff | 206/310 |
| 3,980,178 | 9/1976 | Schidolowski | 206/313 |
| 4,327,831 | 5/1982 | Inaba et al. | 206/310 |
| 4,387,807 | 6/1983 | de la Rosa | 206/312 |
| 4,433,410 | 2/1984 | Siryj et al. | 206/313 X |
| 4,499,996 | 2/1985 | Coyle | 206/444 |
| 4,511,944 | 4/1985 | Saito | 360/133 |
| 4,520,470 | 5/1985 | d'Alayer | 206/310 X |
| 4,583,144 | 4/1986 | Kato | 360/133 |
| 4,609,105 | 9/1986 | Manes et al. | 206/444 |
| 4,630,728 | 12/1986 | Matsumoto et al. | 206/313 |
| 4,661,875 | 4/1987 | Kinjo | 360/133 |
| 4,707,821 | 11/1987 | Verhagen | 206/309 X |

FOREIGN PATENT DOCUMENTS 0085165  8/1983  European Pat. Off. ............ 206/313

OTHER PUBLICATIONS

IBM Technical Disclosure Bulletin, vol. 22, No. 3, Aug. 1979.

*Primary Examiner*—Bryan P. Gehman
*Attorney, Agent, or Firm*—Steinberg & Raskin

[57] ABSTRACT

A disc cartridge capable of preventing a recording surface section of a disc from being contacted with an inner surface of a casing so that the disc may be free from any damage. The disc cartridge includes steps or sheet-like members provided on the inner surface of the casing in a manner to be inwardly projected from the inner surface. The steps or sheet-like members are positioned so as to be engaged with a non-recording surface section of the disc to support the disc thereon, so that a clearance may be defined between the recording surface section of the disc and the inner surface of the casing.

5 Claims, 6 Drawing Sheets

DISC CARTRIDGE HAVING PERIPHERAL DISC SUPPORT

BACKGROUND OF THE INVENTION

1. Field of the Invention

This invention relates to a disc cartridge, and more particularly to a disc cartridge which has a hard disc, particularly, a double-sided type hard disc housed in a casing.

2. Background of the Invention

In general, a disc-type data recording carrier such as a compact disc (CD), a video disc (LD) or the like is used in a manner to be removed from a packing case and set in a recording and/or reproducing equipment.

Conventionally, such a disc type recording carrier has been desirably protected from environment because it is not only readily covered with dust and damaged but is adversely affected due to a variation in temperature. For this purpose, the use of an envelope such as a tray, a casing or the like has been proposed to protect the disc. Unfortunately, such a conventional envelope is not suitable for the protection of a double-sided hard disc, because the the housing of the disc in a storage space defined in the envelope causes the disc to be contacted by the envelope. Also, the envelope causes the disc to be contacted by an inner surface thereof during the storage or transportation. Thus, the use of the envelope results in damage and/or contamination of the disc. Also, the conventional envelope fails to prevent the disc from being exposed to a variation in temperature and is hard in handling.

Accordingly, there is a need for a disc cartridge which is capable of keeping a recording surface section of a disc out of contact with a casing to safely house the disc in the casing.

SUMMARY OF THE INVENTION

Briefly speaking, in accordance with the present invention, a disc cartridge is provided which includes a casing having a space defined therein and a disc rotatably housed in the space of the casing. The disc cartridge also includes disc holding means arranged on an inner surface of the casing to be engaged with at least a part of the disc to support the disc thereon.

In a preferred embodiment, the disc holding means are arranged to support a non-recording surface section of the disc to prevent a recording surface section of the disc from being contacted by the inner surface of the casing. The disc holding means may comprise steps or sheet-like members arranged on the inner surface of the casing so as to be inwardly projected from the inner surface.

Accordingly, it is an object of the present invention to provide a disc cartridge which is capable of preventing a recording surface section of a disc housed in a casing from being contacted by an inner surface of the casing.

It is another object of the present invention to provide a disc cartridge which is capable of safely housing a disc in a casing without damaging the disc.

It is a further object of the present invention to provide a disc cartridge which is capable of safely housing a disc in a casing with a highly simple structure.

It is still another object of the present invention to provide a disc cartridge which is capable of accomplishing the transfer of a disc between a disc driving mechanism of a disc player and a disc receiver arranged in a casing while keeping a recording surface section of the disc in out of contact with an inner surface of the casing, thereby preventing damage of the disc.

It is yet another object of the present invention to provide a disc cartridge which is capable of preventing the damage and contamination of a disc housed in a casing.

It is still a further object of the present invention to provide a disc cartridge for accomplishing the above-noted objects with a simple structure.

Still other objects and advantages of the invention will in part be evident and will in part be apparent from the specification.

The invention accordingly comprises the features of construction, combination of elements, and arrangement of parts which will be exemplified in the construction hereinafter set forth.

BRIEF DESCRIPTION OF THE DRAWINGS

For a fuller understanding of the invention, reference is made to the following description taken in connection with the accompanying drawings in which like reference numerals designate like or corresponding parts throughout; wherein.

DETAILED DESCRIPTION OF THE PREFERRED EMBODIMENT

Now, a disc cartridge according to the present invention will be described hereinafter with reference to the accompanying drawings.

Figure 1:
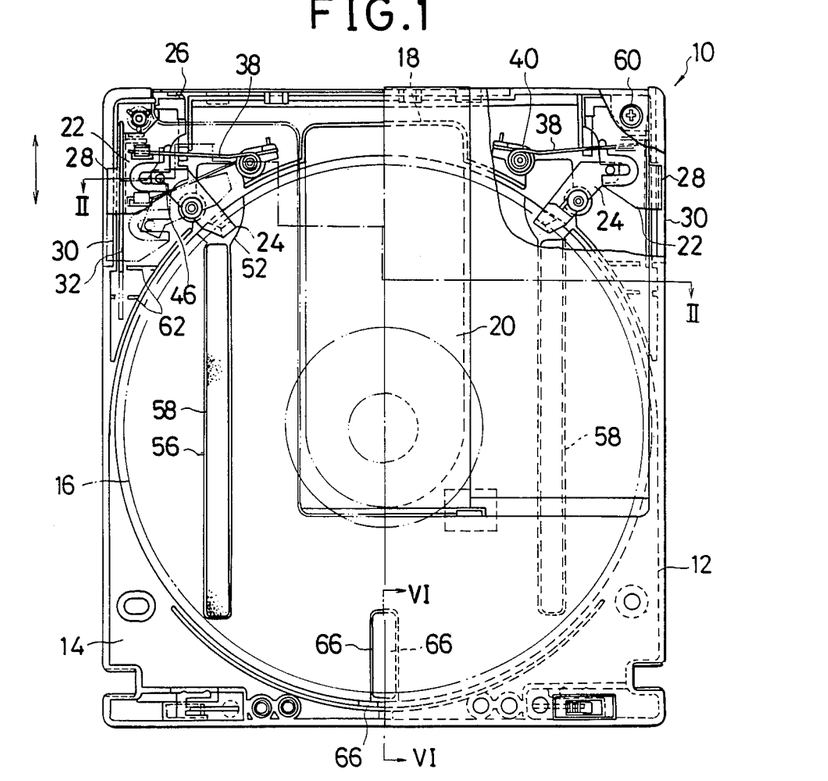
FIG. 1 is a partly cutaway plan view showing an embodiment of a disc cartridge according to the present invention.

FIG. 1 shows an embodiment of a disc cartridge according to the present invention.

Figure 2:
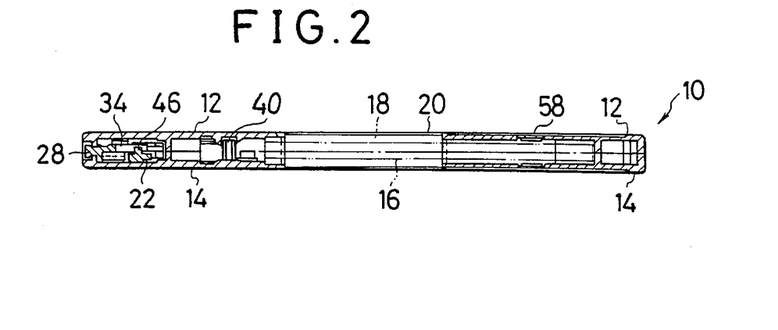
FIG. 2 is a sectional view taken along line II—II of FIG. 1.
Figure 3:
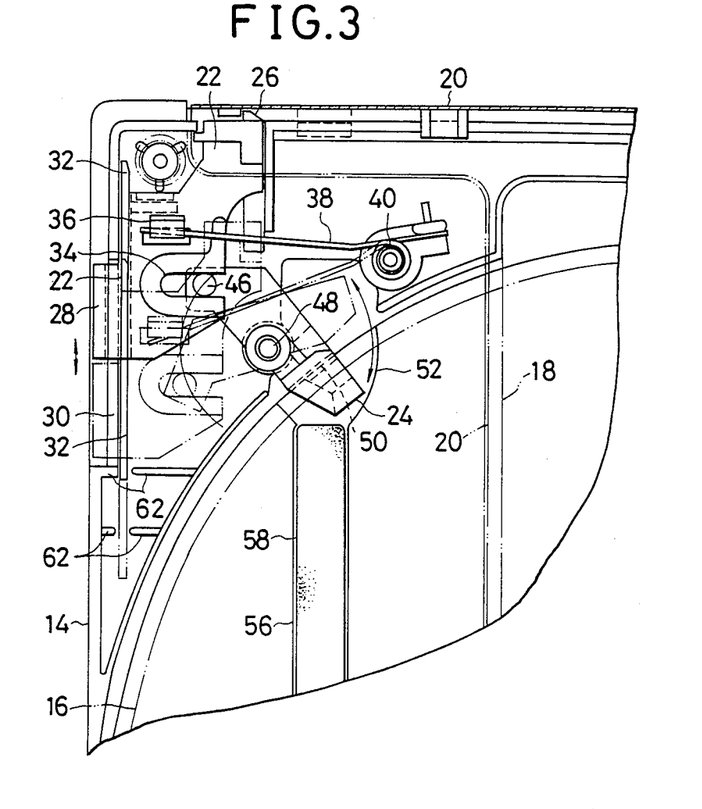
FIG. 3 is partly enlarged view showing a mechanical section of the disc cartridge shown in FIG. 1.

A disc cartridge of the illustrated embodiment, as shown in FIGS. 1 to 3, includes a casing 10 comprising an upper cover plate 12 and a lower cover plate 14 joined together so as to define a space therein, and a disc 16 received or housed in the casing 10. The casing 10 is formed with at least a window 18 for inserting a recording and reproducing head (not shown) therethrough into the casing 10. In the illustrated embodiment, the window 18 may be provided at each of the upper and lower cover plates 12 and 14. The window 18 is operated by a shutter 20. Also, the disc cartridge includes a pair of actuators 22 arranged in the casing 10 for releasably locking the shutter 20 and a pair of disc receivers 24 provided in the casing 10 and operatively connected to or engaged with the corresponding actuators 22. The disc receivers 24 each are adapted to selectively receive a part of a peripheral portion of the disc 16 or a part of each upper, lower and peripheral end surfaces of the disc 16. The actuators 22 each are arranged to be slidable in a longitudinal direction of the cartridge indicated by arrows in FIGS. 1 and 3 and the disc receivers 24 each are adapted to be approachably moved with respect to the disc 16 when the actuator 22 is slidably moved; so that when the shutter 20 is actuated to close the window 18, the disc 16 may be engaged with each of the disc receivers 24 to be forced toward a rear end of the casing 10 while being held at substantially a center of the casing 10 in a width direction of the casing, to thereby be kept at a state of floating in the space defined in the casing 10, whereas when the shutter 20 is actuated to open the window 18, each of the disc receivers 24 may be disengaged from the disc 16 to prepare the disc for engagement with a recording and/or reproducing head which is then inserted through the so-opened window into the cartridge.

In the illustrated embodiment, the shutter 20 comprises a plate member of a substantially U-shape which is movably fitted on the casing 10 so as to be slidable along the upper and lower cover plates 12 and 14.

The actuators 22, as shown in FIG. 1, are formed to be symmetrical with each other, and arranged adjacent to both sides of a front portion of the casing 10 in a manner to be not only opposite to each other but symmetrical along a longitudinal axis of the cartridge and slidable with respect to the casing 10. Also, the actuators each serves as an actuating lever to drive operation sections of the disc cartridge. More particularly, each of the actuators 22, as clearly shown in FIG. 3, is provided at a front end thereof with lock means 26, which comprise, in the illustrated embodiment, a hook-like member integrally formed at the front end of the actuator 22 and is securely engaged with the shutter 20. The actuator 20 is also provided on one side or an outside thereof with actuating means 28 which comprise, in the illustrated embodiment, a projection integrally formed on the outside of the actuator and outwardly extending through an horizontally extending cutout 30 formed at a side wall of the casing 10. Also, the actuator 22 has cover means 32 integrally provided on the one side thereof so as to extend in a longitudinal direction thereof. The cover means 32 is adapted to thoroughly cover the cutout 30 formed at the side wall of the casing 10 in a sealed manner to function as a dust protective cover for preventing any dust from entering the casing 10 through the cutout 30. In addition, the actuator 22 is formed on the other side thereof with a guide groove 34 of a substantially U-shape. Further, the actuator 22, as best seen in FIG. 3, is provided on an upper surface thereof with a spring bearing member 36 which is engaged with one end of a spring 38 held at the other end thereof on a spring holder 40 fixed on the casing 10, so that the actuator 22 may be constantly forced toward a front end of the casing 10 by means of the spring 38.

Figure 4:
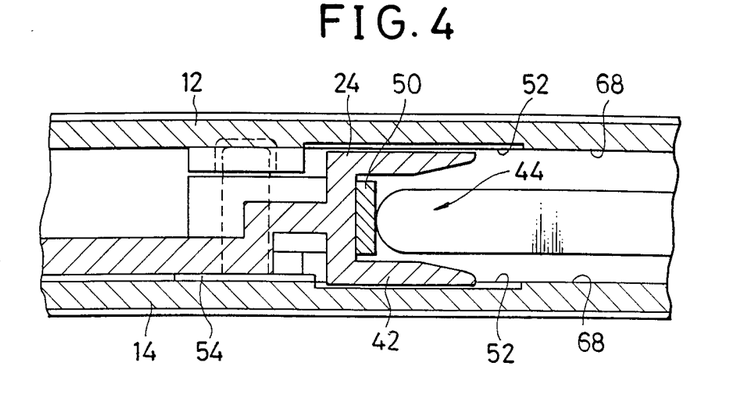
FIG. 4 is an enlarged sectional view showing a part of a disc receiver.
Figure 5:
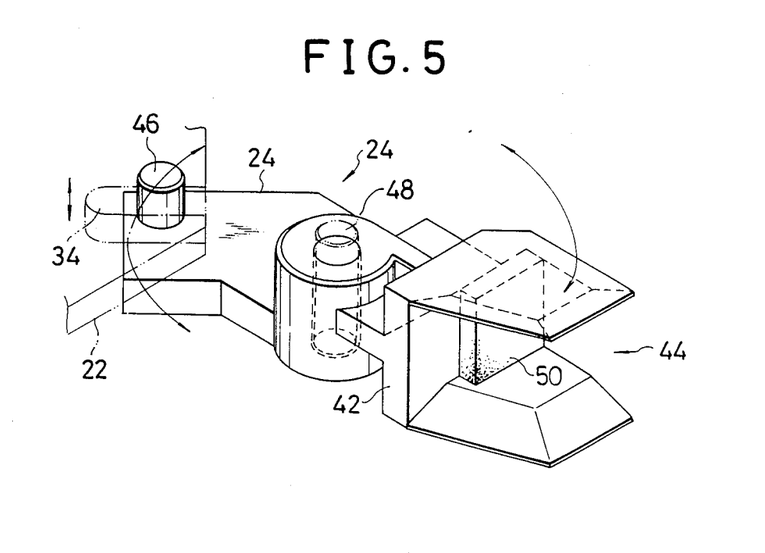
FIG. 5 is a perspective view showing a disc receiver.

Likewise, a pair of the disc receivers 24, as shown in FIG. 1, are formed so as to be symmetrical with each other. Each of the disc receivers 24, as shown in FIGS. 4 and 5, is generally formed into a shape like a lever and provided at one end thereof with a receiver body 42. The receiver body 42 is formed into a substantially sideways U-shape to define therein a recess 44 in FIG. 4. The so-formed receiver body 42 is positioned adjacent to a peripheral portion of the disc 16 to selectively receive a part of the peripheral portion in the recess 44 and also act as an elevator for lifting the disc 16. The disc receiver 24 is also provided at the other end thereof with a guide pin 46 which is loosely fitted in the guide groove 34 of the actuator 22 to connect the disc receiver 24 to the actuator 22. The disc receiver 24 is movably supported at a middle portion thereof on a pivot pin 48 so as to be rotatable about the pin 48 and vertically movable along the pin 48. The receiver body 42 preferably has an elastic member 50 arranged on a portion thereof contacting with the peripheral portion of the disc 16 such as an inner surface of the recess, as shown in FIG. 4. The elastic member 50 serves to prevent unsteadiness and damage of the disc in the casing 10 and may be formed of, for example, rubber or a soft plastic material such as polyethylene, polypropylene or vinyl chloride or the like. Such an elastic member may be arranged on upper and lower surfaces of the recess of the receiver body 42.

In the illustrated embodiment, the guide pin 46 is provided at the disc receiver 24 and the guide groove 34 is formed at the actuator 22. However, the guide pin 46 and guide groove 34 may be provided at the actuator 22 and disc receiver 24, respectively.

Also, in the illustrated embodiment, the spring 38 may comprise a coiled spring stretchedly arranged in the sliding direction of the actuator 22 or between the disc receiver 24 operatively connected to the actuator 22 and the casing 10. Alternatively, it may comprise a coiled spring wound on the pivot pin 48 of the disc receiver 24. Each of the such constructions likewise causes the actuator 22 to be forced toward the front end of the casing 10.

The casing is formed on each of upper and lower inner surfaces thereof with a pair of recesses 52 so as to positionally correspond to the disc receivers. The recess 52 serves to ensure the smooth movement of the disc receiver. The disc receiver 24 is supported on a holder 54. Also, the bottom surface of the casing 10 is formed with a pair of elongated grooves 56, on each of which a sheet 58 exhibiting lubricating properties is sticked. Reference numerals 60 and 62 designate bolts and ribs, respectively.

In the illustrated embodiment, as shown in FIGS. 4 and 5, the recess 44 of the receiver body 42 of a sideways U-shape is formed at an inlet portion thereof into a vertically enlarged shape, to thereby facilitate the insertion and removal of the disc 16 with respect to the recess 44.

Figure 6:
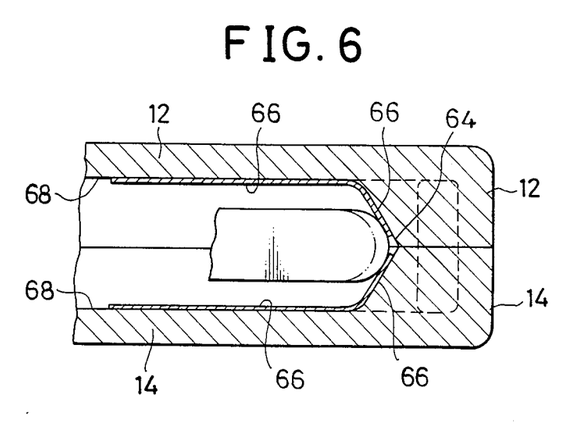
FIG. 6 is a sectional view taken along line VI—VI of FIG. 1.

Also, in the illustrated modification, as shown in FIG. 6, the casing 10 is formed at a rear end 64 thereof into a substantially V-shape, so that the rear end may be tapered. Such construction facilitates the positioning of the disc 16 at a center in the casing 10 because it is guided along the tapered rear end 64. This results in the disc 16 being located at positions indicated at two-dot chain lines and solid lines in FIG. 6 when the disc cartridge is charged in a disc player and removed therefrom, respectively. Also, the embodiment may be constructed in a manner such that a disc holding material 66 which exhibits lubricating properties is applied to the tapered rear end 64 of the casing 10 to ensure the safety and smooth operation of the disc 16. Such a material likewise may be applied to portions of the casing 10 adjacent to the tapered rear end 64 as shown in FIG. 6. The lubricating material may be selected from a group consisting of ultra-high molecular-weight polyethylene, ultra-high-molecular-weight polyethylene foam, polyethylene terephthalate, metal such as stainless steel and the like.

Figure 7:
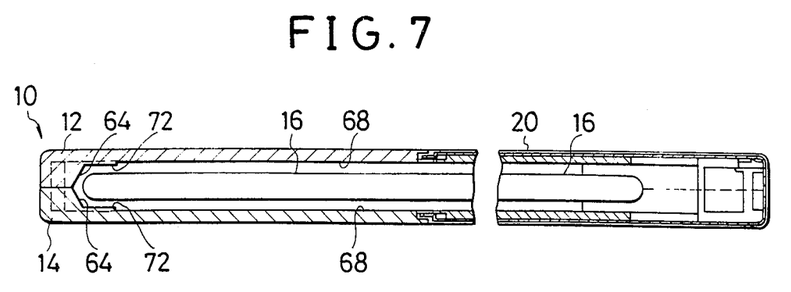
FIG. 7 is a vertical sectional view showing the disc cartridge of FIG. 1.
Figure 8:
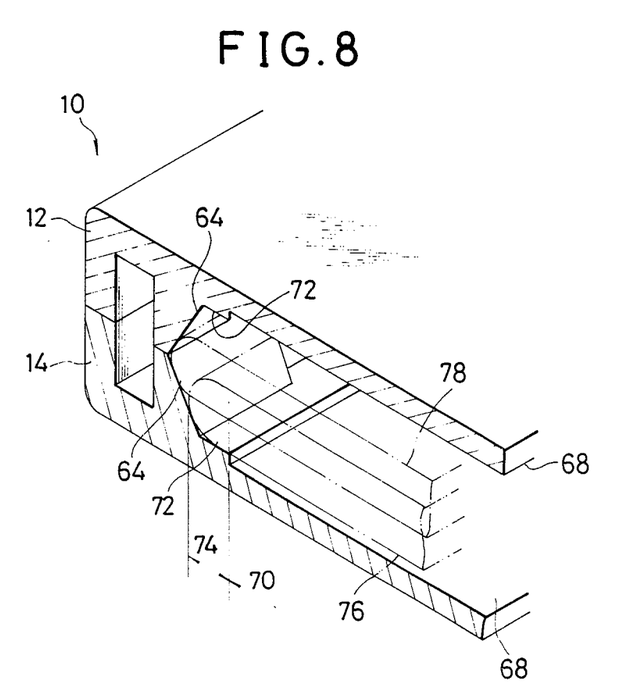
FIG. 8 is a fragmentary perspective view in section showing a part of the disc cartridge of FIG. 1.

Another feature of the illustrated embodiment, as shown in FIGS. 7 and 8, is that in order to provide between the disc 16 and an inner surface 68 of the casing 10 a clearance sufficient to prevent a recording surface section 70 of the disc 16 from being contacted with the inner surface 68, the disc cartridge is provided with disc holding means 72 which, in the illustrated embodiment, comprises at least a step formed on each of upper and lower surface sections of the inner surface 68 in a manner to be inwardly projected therefrom. The steps 72 are adapted to be engaged with a non-recording section 74 of the disc 16 to support the disc thereon. Thus, when the disc cartridge is charged in a disc player, the disc 16 is engaged with a driving mechanism of the disc player to be kept at a state of floating in the space in the casing 10 as shown in Fig. 7; whereas, when the disc 16 is disengaged from the driving mechanism for the purpose of removal of the disc cartridge from the disc player, it is first supported on the disc holding means or step 72 as indicated at reference numeral 76 in FIG. 8 and then pushed by the disc receiver 24 to be positioned at a center of the casing as indicated at reference numeral 78 in FIG. 8.

In the illustrated embodiment, the steps may be arranged so as to positionally correspond to the nonrecording section 74 of the disc 16 such as a peripheral portion thereof as shown in FIGS. 7 and 8, a central portion thereof, or the like.

Further, the steps 72 each may be formed into a continuous ring-like shape on the inner surfaces of the casing 10. Also, they may be noncontinuously arranged at several places on the inner surface of the casing. Alternatively, the steps 72 may be symmetrically arranged in a manner to be spaced from each other. In addition, the steps each may be shaped in the form of a rib, a spherical or semi-spherical projection, a corrugated projections, or the like.

Figure 9:
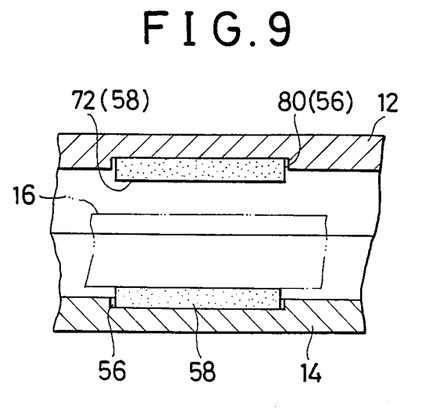
FIG. 9 is a fragmentary sectional view showing a part of a modification of the disc cartridge shown in FIG. 1.
Figure 10:
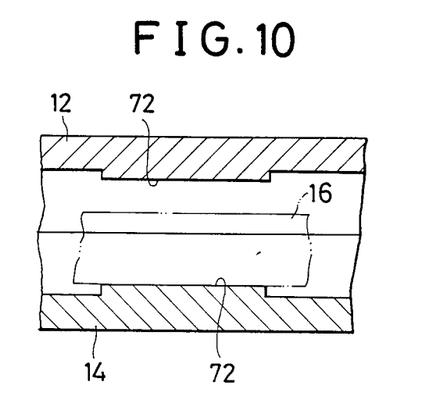
FIG. 10 is a fragmentary sectional view showing a further modification of the disc cartridge shown in FIG. 1.

Furthermore, the illustrated embodiment, as shown in FIGS. 9 and 10, may be modified in a manner such that the disc holding means 72 comprises at least a sheet-like member applied to at least a part of each of the upper and lower surface sections of the inner surface 68 of the casing 10. The sheet-like member 72 may be arranged in a manner to project from the inner surface 68. The sheet-like member 72 may be formed of at least a material selected from the group consisting of ultra-high molecular-weight polyethylene, ultra-high-molecular polyethylene foam, graphite teflon, polyethylene terephthalate (PET) and polybutylene terephthalate (PBT). In the modification, the sheet-like member 72 is arranged so as to positionally correspond to the non-recording surface section 74 of the disc 16 such as a peripheral section of the disc or the like so that it may be abutted against the section 74 to support the disc thereon. Alternatively, the sheet-like member may be positioned at a position of causing it to be abutted against a part of the recording surface section 70 of the disc to support the disc thereon unless it is formed of such an elastic material as described above, because it does not hurt or damage the recording surface section of the disc.

The sheet-like member 72 may be securely positioned in a recess 80 formed on the inner surface 68 of the casing 10 in a manner to be inwardly projected therefrom, as shown in FIG. 9. The sheet-like member may be formed into any suitable shape such as a rectangular shape, a semi-spherical shape, a disc-like shape or the like. Alternatively, it may be applied directly to each of the inner surfaces or any projection formed on the inner surface.

Further, the sheet-like members 72 each may be arranged in a continuous ring-like manner on the inner surface 68 of the casing 10 in a manner to positionally correspond to the non-recording surface section 74. Also, the may be discontinuously arranged at several places on the inner surface of the casing. Alternatively, the sheetlike members 72 may be symmetrically or concentrically arranged in a manner to be spaced from each other on the inner surface 68 of the casing 10.

Thus, the sheet-like member 72 arranged in a manner to be projected from the inner surface 68 causes any clearance to be defined between the recording surface section of the disc and the casing, so that the disc 16 may be kept at a state of floating in the space of the casing to a degree sufficient to facilitate the insertion of a part of the disc receiver thereinto.

In the modification shown in FIG. 9, it is a matter of course that each of the sheets 58 and each of the grooves 56 are used as the sheet-like member 72 and recess 80, respectively.

Alternatively, as shown in FIG. 10, a projection serving as the disc holding means 72 may be formed of the above-described material into a sheet-like shape and so as to be integral with the casing 10 on each of the upper and lower surface sections of the inner surface 68.

Now, the manner of operation of the disc cartridge of the illustrated embodiment constructed as described above will be described hereinafter with reference to FIGS. 1 to 10.

When the disc cartridge is inserted in a disc player (not shown) for the operation, the actuating means or projection 28 of the actuator 22 projecting through the cutout 30 of each of the side plates of the casing 10 is engged with a projection provided at an insertion port of the disc player to be rearwardly slided along the cutout 30. The sliding of the projection 28 causes the shutter 20 to be released from the lock means or hook-like member 26, so that the shutter 20 may be moved in a direction of opening the window 18 by means of a shutter actuating mechanism of the disc player. Concurrently, the disc receiver 24 is pivotally moved about the pivot pin 48 due to the sliding of the actuator 22 to release the disc 16 therefrom, resulting in the disc 16 being safely supported on the lubricating sticked sheet 58 and then operatively engaged with a disc driving mechanism of the disc player, during which the nonrecording surface section 74 or recording surface section 70 of the disc is engaged with the disc holding means 72 to support the disc thereon to prevent the recording surface section 70 of the disc from being contacted with the inner surface 68 of the casing 10, so that the disc may be free from damage.

When, the disc cartridge is to be removed from the disc player, the disc 16 is first disengaged from the disc driving mechanism of the disc player to be put on the lubricating sticked sheet 58 and then the shutter 20 is moved by means of the shutter actuating mechanism of the disc player to close the window 18. Then, the disc cartridge is removed from the disc player, so that the actuator 22 may be slided toward a front end of the disc cartridge by means of the spring 38 to actuate the disc receiver 24, to thereby fit a part of the disc 16 in the receiver body 42. During the transfer of the disc from the disc driving mechanism of the disc player to the disc receiver 24, the non-recording surface of non-recording surface section section 74 of the disc 16 is supported on the disc holding means 72 to smoothly carry out the transfer while preventing the contact of the recording surface section of the disc with the inner surface of the casing 10. The engagement between the disc receiver 24 and the disc results in the disc 16 being forced toward the rear end of the casing 10 while being held at a state of floating in the the space in the casing 10. Simultaneously, the lock means 26 of the actuator 22 actuates to keep the shutter 20 closed.

As can be seen from the foregoing, the present invention is constructed in a manner such that the disc holding means which serves to prevent contacting between the recording surface section of the disc and the inner surface of the casing are arranged on the inner surface of the casing, so that the transfer of the disc between a driving mechanism of a disc player and the disc receiver may be safely carried out without damaging the recording surface section of the disc.

Accordingly, it will be noted that the recording surface section of the disc is constantly kept from contact with the inner surface of the casing, resulting in the disc being kept safe for a long period of time.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What is claimed is:

1. A disc cartridge, comprising:
    a casing having a space defined therein;
    a disc rotatably housed in said space of said casing; and
    disc holding means engaged with at least a part of said disc to support said disc thereon, said disc holding means being arranged on an inner surface of said casing;
    said disc holding means arranged to support a non-recording surface section of said disc to prevent a recording surface section of said disc from being contacted by said inner surface of said casing;
    said disc holding means comprising sheet-like members arranged on upper and lower surface sections of said inner surface of said casing in a manner such that at least a part of each of said sheet-like members inwardly projects from said inner surface of said casing; and
    said sheet-like members are arranged to positionally correspond to a peripheral section of said disc.

2. A disc cartridge as defined in claim 1, wherein said sheet-like members are at least partially formed of a material selected from the group consisting of ultra-high-molecular polyethylene, graphite teflon, polyethylene terephthalate and polybutylene terephthalate.

3. The cartridge of claim 1, additionally comprising recesses formed on upper and lower surface sections of said casing, and in which said respective sheet-like members are securely positioned.

4. The cartridge of claim 1, wherein said sheet-like members are arranged in a continuous ring-like manner.

5. The cartridge of claim 1, wherein said sheet-like members are arranged in an intermittent ring-like manner.

* * * * *